US012166699B2

(12) United States Patent
Kim et al.

(10) Patent No.: US 12,166,699 B2
(45) Date of Patent: Dec. 10, 2024

(54) ELECTRONIC DEVICE AND METHOD FOR PROCESSING RADIO FREQUENCY SIGNALS HAVING DIFFERENT FREQUENCY BANDS

(71) Applicant: Samsung Electronics Co., Ltd., Gyeonggi-do (KR)

(72) Inventors: Joo Seung Kim, Gyeonggi-do (KR); Young Ju Kim, Gyeonggi-do (KR); Jung Joon Kim, Gyeonggi-do (KR); Sung Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/371,533

(22) Filed: Sep. 22, 2023

(65) Prior Publication Data

US 2024/0072949 A1    Feb. 29, 2024

Related U.S. Application Data (63) Continuation of application No. 17/693,989, filed on Mar. 14, 2022, now Pat. No. 11,804,932, which is a
(Continued)

(30) Foreign Application Priority Data

Aug. 10, 2017    (KR) .................. 10-2017-0101434

(51) Int. Cl.
*H04B 1/04* (2006.01)
*H04L 5/00* (2006.01)
*H04L 5/14* (2006.01)

(52) U.S. Cl.
CPC ............ *H04L 5/001* (2013.01); *H04B 1/04* (2013.01); *H04L 5/1423* (2013.01); *H04B 2001/045* (2013.01)

(58) Field of Classification Search
CPC ............................ H04B 1/04; H04L 5/1425
(Continued)

(56) References Cited

U.S. PATENT DOCUMENTS 8,649,746 B2    2/2014  Kang et al.
9,065,523 B2    6/2015  Campos et al.
(Continued)

FOREIGN PATENT DOCUMENTS

KR    10-2004-0018094 A    3/2004
KR    10-2009-0056613 A    6/2009
(Continued)

OTHER PUBLICATIONS

IP.com KR 2015-0118052 A; 1-17 pages; Published Oct. 21, 2015.
(Continued)

*Primary Examiner* — Dang T Ton
(74) *Attorney, Agent, or Firm* — Cha & Reiter, LLC (57) ABSTRACT

According to various embodiments of the present invention, disclosed is an electronic device comprising: a first antenna element configured so as to transmit and receive a signal of a first frequency band or a second frequency band; a second antenna element configured so as to transmit and receive the signal of the first frequency band or the second frequency band; a first RF block electrically connected to the first antenna element and the second antenna element and including a first transmission and reception circuit and a second transmission and reception circuit; an RF reception circuit for receiving the signal of the first frequency band or the second frequency band from the first antenna element or the second antenna element; and a transceiver, wherein the first transmission and reception circuit processes the signal of the first frequency band or the second frequency band, the second transmission and reception circuit processes the signal of the first frequency band or the second frequency
(Continued)

band, and the transceiver performs CA on the signal of the first frequency band and/or the second frequency band and performs diversity on the signals received from the first RF block and the RF reception circuit.

12 Claims, 6 Drawing Sheets

Related U.S. Application Data continuation of application No. 16/637,029, filed on Feb. 6, 2020, now Pat. No. 11,290,225, which is a continuation of application No. PCT/KR2018/009020, filed on Aug. 8, 2018.

(58) Field of Classification Search
USPC .......................................... 370/329, 405, 395
See application file for complete search history.

(56) References Cited

U.S. PATENT DOCUMENTS

| | | |
|---|---|---|
| 9,088,313 B2 | 7/2015 | Campos et al. |
| 9,231,672 B2 | 1/2016 | Campos et al. |
| 9,287,956 B2 | 3/2016 | Campos et al. |
| 9,319,257 B2 | 4/2016 | Campos et al. |
| 9,923,621 B2 | 3/2018 | Campos et al. |
| 10,218,390 B2 | 2/2019 | Wloczysiak et al. |
| 11,916,577 B2* | 2/2024 | Pehlke .................... H04B 1/12 |
| 2004/0198420 A1 | 10/2004 | He et al. |
| 2008/0280574 A1 | 11/2008 | Rofougaran et al. |
| 2008/0299935 A1 | 12/2008 | Safarian et al. |
| 2013/0072139 A1 | 3/2013 | Kang et al. |
| 2015/0295596 A1 | 10/2015 | Wloczysiak et al. |
| 2019/0268027 A1 | 8/2019 | Wloczysiak et al. |
| 2021/0136788 A1 | 5/2021 | Lim et al. |
| 2022/0376824 A1 | 11/2022 | Sun et al. |

FOREIGN PATENT DOCUMENTS

| | | |
|---|---|---|
| KR | 10-2013-0031465 A | 3/2013 |
| KR | 10-2015-0118052 A | 10/2015 |
| KR | 10-2015-0128729 A | 11/2015 |

OTHER PUBLICATIONS

IP.com KR 2009-0056613 A; 1-11 pages; Published Jun. 3, 2009.
IP.com KR 2004-0018094 A; 1-7 pages; Published Mar. 2, 2004.
3GPP TSG RAN WGI #97; Reno, USA, May 13-17, 2019; InterDigital, Inc.; RI-1907094.
IP.com, KR 2013-0031465, 1-14 pages, Mar. 29, 2013.

* cited by examiner

ELECTRONIC DEVICE AND METHOD FOR PROCESSING RADIO FREQUENCY SIGNALS HAVING DIFFERENT FREQUENCY BANDS

CROSS REFERENCE TO RELATED APPLICATIONS

This application is a Continuation of U.S. patent application Ser. No. 17/693,989 filed on Mar. 14, 2022, which is a continuation of U.S. patent application Ser. No. 16/637,029 filed on Feb. 6, 2020 and assigned U.S. Pat. No. 11,290,225 issued on Mar. 29, 2022, which is a Continuation of PCT International Application No. PCT/KR2018/009020, which was filed on Aug. 8, 2018, which claims priority to Korean Patent Application No. 10-2017-0101434, which was filed on Aug. 10, 2017, the contents of which are incorporated herein by reference.

TECHNICAL FIELD

The disclosure relates to technologies of processing radio frequency (RF) signals of different frequency bands.

BACKGROUND ART

With the development of information technology (IT), various types of electronic devices such as smartphones and tablet personal computers (PCs) have come into wide use. The electronic devices may wirelessly communicate with another electronic device or a base station using their antennas. According to 4G wireless communication standards, a mobile network operator may provide a wireless communication service to a user of the electronic device by using frequency bands authorized by a country (authority) among various frequency bands.

The frequency bands may be divided on the basis of, for example, a frequency range defined by $3^{rd}$ generation partnership project (3GPP). One frequency band may have a bandwidth of dozens and hundreds of MHz. The frequency bands may be roughly classified into a low band, a mid band, and a high band according to relative frequency height.

The electronic device may transmit signals with the above-mentioned frequency bands to a base station (or another electronic device) or may receive signals with the above-mentioned frequency bands from the base station (or the other electronic device). The electronic device may include, for example, an RF block optimized for the low band, the mid band, or the high band.

To enhance quality or a download speed of a signal received by the electronic device, technologies such as carrier aggregation (CA) or Rx diversity have been developed. Respective countries and/or operators provide an enhanced communication service to the user through so-called CA of aggregating two or more frequency bands.

DISCLOSURE

Technical Problem

CA may be performed between lower frequency bands, included in a low band, a mid band, and a high band. For example, any one frequency band which belongs to the mid band and any one frequency band which belongs to the high band may be aggregated into each other. Meanwhile, because a frequency band adopted for implementing the CA is able to differ for each network operator, an electronic device should be able to implement CA using combinations of various frequency bands as many as possible. To implement CA using the various combinations, additional antennas and related components may be required. However, because a mounting region of a smartphone or a tablet PC is limited, it is very difficult for the electronic device to implement CA using combinations of various frequency bands.

According to embodiments of the disclosure, an aspect of the disclosure is to provide a method for implementing CA using combinations of various frequency bands by efficiently using an RF block and an antenna and an electronic device for performing the same.

Technical Solution

In accordance with an aspect of the disclosure, an electronic device is provided. The electronic device may include a first antenna, a second antenna, a filter, electrically connected with the first antenna, including a first connecting terminal corresponding to a first frequency band and a second frequency band capable of being transmitted or received via the first antenna, and a second connecting terminal corresponding to a third frequency band capable of being transmitted or received via the first antenna, a first wireless module including a first transmit and receive circuitry for processing a signal of the first frequency band and a signal of the second frequency band, a second transmit and receive circuitry for processing a signal of the first frequency band and a signal of the second frequency band, a first transmission and reception connection terminal connected with the first connecting terminal, and a second transmission and reception connection terminal connected with the second antenna, and a first switch for connecting the first transmit and receive circuitry and the second transmit and receive circuitry with the first transmission and reception connection terminal or the second transmission and reception connection terminal, and a second wireless module including a third transmit and receive circuitry, electrically connected with the second connecting terminal, for processing a signal of the third frequency band.

In accordance with another aspect of the disclosure, an electronic device is provided. The electronic device may include a first antenna element configured to transmit and receive a signal of a first frequency band or a second frequency band, a second antenna element configured to transmit and receive a signal of the first frequency band or the second frequency band, a first RF block, electrically connected with the first antenna element and the second antenna element, including a first transmit and receive circuitry and a second transmit and receive circuitry, an RF receive circuitry for receiving the signal of the first frequency band or the second frequency band from the first antenna element or the second antenna element, and a transceiver connected with the first RF block and the RF receive circuitry. The first transmit and receive circuitry may process the signal of the first frequency band or the second frequency band. The second transmit and receive circuitry may process the signal of the first frequency band or the second frequency band. The transceiver may perform carrier aggregation (CA) for the signal of the first frequency band and/or the signal of the second frequency band using the first transmit and receive circuitry and the second transmit and receive circuitry and may perform diversity for signals received from the first RF block and the RF receive circuitry.

In accordance with another aspect of the disclosure, a method is provided. The method may include transmitting and receiving a signal of a first frequency band or a second frequency band via an antenna element, performing CA for the signal of the first frequency band and/or the second frequency band using a first transmit and receive circuitry and a second transmit and receive circuitry, which are included in a first RF block, and performing diversity for the signal of the first frequency band or the second frequency band using the first RF block and an RF receive circuitry.

Advantageous Effects

According to embodiments disclosed in the disclosure, an RF block for processing a signal of a mid band and an RF block for processing a signal of a high band are integrated with each other to minimize a space where components are mounted and efficiently use antennas. Thus, the electronic device may implement CA using combinations of various frequency bands in a limited mounting region, thus maximizing communication performance of the electronic device. In addition, the electronic device may use spare antennas as antennas capable of supporting a 5G communication service by efficiently using the antennas. In addition, various effects directly or indirectly ascertained through the disclosure may be provided.

In describing the drawings, the same or similar reference denotations may be used to refer to the same or similar components.

MODE FOR INVENTION

Figure 1:
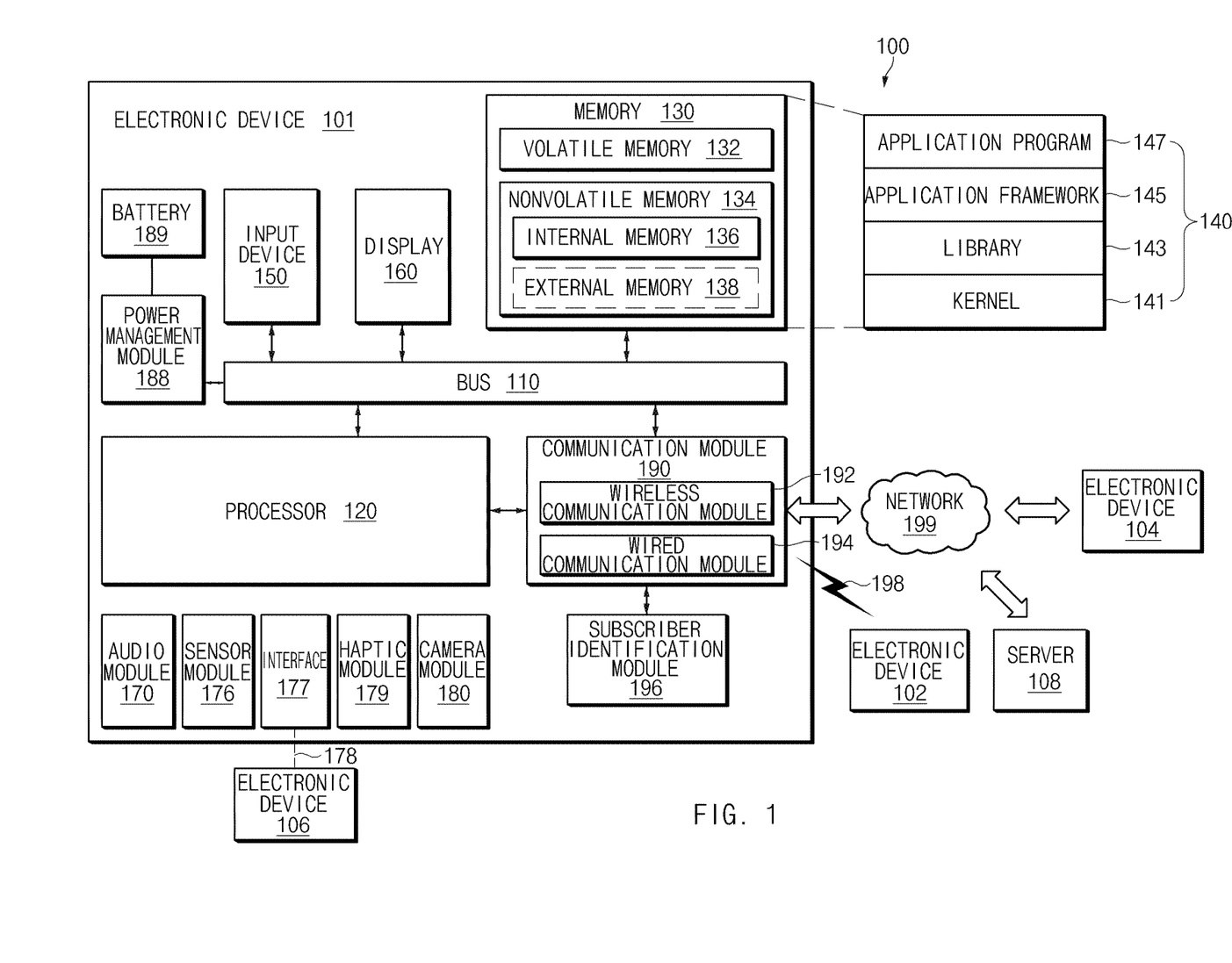
FIG. 1 is a block diagram of an electronic device in a network environment according to various embodiments.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

In the disclosure, a frequency band may refer to a band defined in 3GPP. The frequency band and the band may be interchangeably referred to as each other in the disclosure. The bandwidth may refer to an uplink or downlink frequency range of a frequency band. The uplink frequency range and the downlink frequency range are distinguished from each other in a frequency division duplex (FDD) mode, whereas the uplink frequency range and the downlink frequency range are the same as each other in a time division duplex (TDD) mode. Furthermore, each frequency band may be divided into a low band, a mid band, and a high band according to a used bandwidth. For example, according to the 3GPP band definition, each band may be divided into three groups, such as low/mid/high bands, like Table 1 below according to an assigned bandwidth.

TABLE 1

| Band No. | Band Definition | Uplink Frequency Range | Downlink Frequency Range | FDD/TDD |
|---|---|---|---|---|
| 1 | Mid-Band | 1920-1980 | 2110-2170 | FDD |
| 2 | Mid-Band | 1850-1910 | 1930-1990 | FDD |
| 3 | Mid-Band | 1710-1785 | 1805-1880 | FDD |
| 4 | Mid-Band | 1710-1755 | 2110-2155 | FDD |
| 5 | Low-Band | 824-849 | 869-894 | FDD |
| 7 | High-Band | 2500-2570 | 2620-2690 | FDD |
| 8 | Low-Band | 880-915 | 925-960 | FDD |
| 9 | Mid-Band | 1749.9-1784.9 | 1844.9-1879.9 | FDD |
| 10 | Mid-Band | 1710-1770 | 2110-2170 | FDD |
| 11 | Mid-Band | 1427.9-1452.9 | 1475.9-1500.9 | FDD |
| 12 | Low-Band | 698-716 | 728-746 | FDD |
| 13 | Low-Band | 777-787 | 746-756 | FDD |
| 14 | Low-Band | 788-798 | 758-768 | FDD |
| 17 | Low-Band | 704-716 | 734-746 | FDD |
| 18 | Low-Band | 815-830 | 860-875 | FDD |
| 19 | Low-Band | 830-845 | 875-890 | FDD |
| 20 | Low-Band | 832-862 | 791-821 | FDD |
| 21 | Mid-Band | 1447.9-1462.9 | 1495.5-1510.9 | FDD |
| 25 | Mid-Band | 1850-1915 | 1930-1995 | FDD |
| 26 | Low-Band | 814-849 | 859-894 | FDD |
| 28 | Low-Band | 703-748 | 758-803 | FDD |
| 33 | Mid-Band | 1900-1920 | 1900-1920 | TDD |
| 38 | High-Band | 2570-2620 | 2570-2620 | TDD |
| 39 | Mid-Band | 1880-1920 | 1880-1920 | TDD |
| 40 | High-Band | 2300-2400 | 2300-2400 | TDD |
| 41 | High-Band | 2496-2690 | 2496-2690 | TDD |
| 44 | Low-Band | 703-803 | 703-803 | TDD |

Each band may be categorized into a first frequency band, a bandwidth of which belongs to a first frequency range, a second frequency band, a bandwidth of which belongs to a second frequency range, and a third frequency band, a bandwidth of which belongs to a third frequency band. Herein, the second frequency range may be defined to be greater than a maximum value of the third frequency range and is less than a minimum value of the first frequency range. In an embodiment, the first frequency band, the second frequency band, and the third frequency band may correspond to the high band, the mid band, and the low band, which are defined in 3GPP, respectively.

According to various embodiments, the first frequency band, the second frequency band, and the third frequency band may be defined to be different from those in the 3GPP. For example, a band using a frequency of 2000 MHz or more may be defined as the first frequency band.

In an embodiment disclosed in the disclosure, the first frequency band will be described as being a high frequency band, the second frequency band will be described as being an intermediate frequency band, and the third frequency band will be described as being a low frequency band. For example, the low frequency band may be about 700 MHz to 900 MHz, the intermediate frequency band may be 1.4 GHz to 2.2 GHz, and the high frequency band may be about 2.3 GHz to 2.7 GHz. However, categorization criteria may be defined different from being provided in the above example or 3GPP standards and may be categorized into 4 or more frequency bands.

Figure 2:
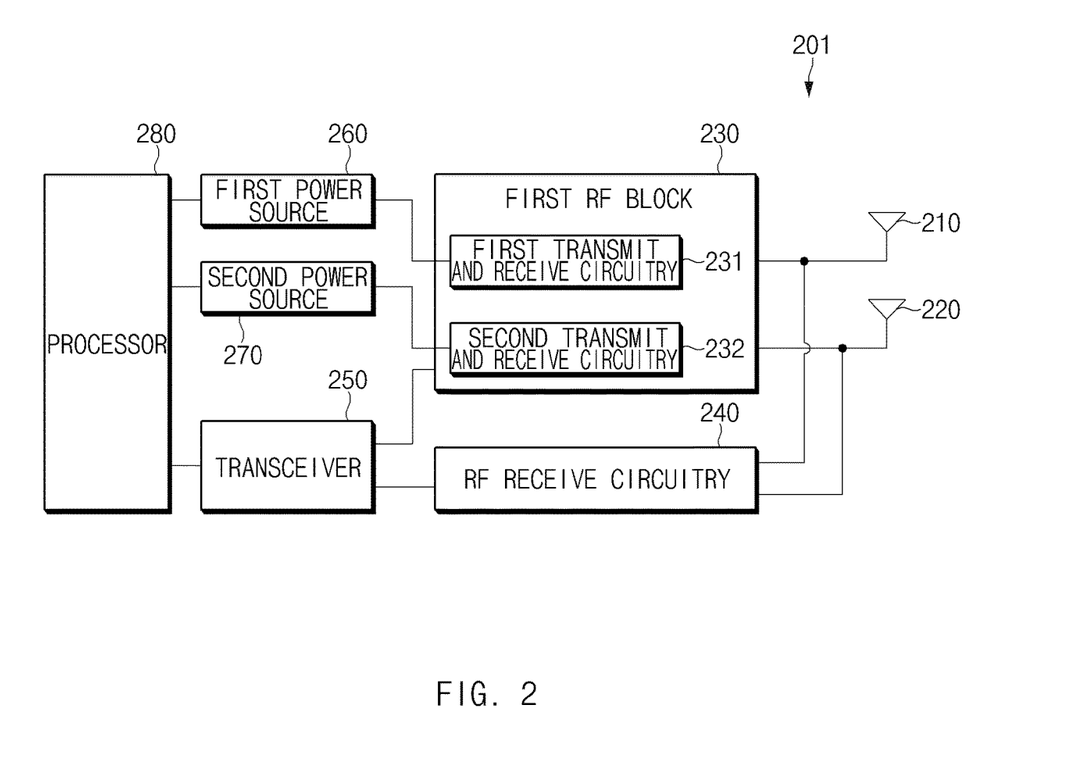
FIG. 2 illustrates a block diagram of an electronic device according to an embodiment.

FIG. 2 illustrates a block diagram of an electronic device according to an embodiment.

Referring to FIG. 2, an electronic device 201 may include a first antenna element 210, a second antenna element 220, a first RF block 230, an RF receive circuitry 240, a transceiver 250, a first power source 260, a second power source 270, and a processor 280. The electronic device 201 may correspond to, for example, an electronic device 101 of FIG. 1.

The first antenna element 210 (e.g., an antenna module 197) according to various embodiments may transmit an RF signal to another device (e.g., a base station) or may receive an RF signal from the other device. According to an embodiment, the first antenna element 210 may include a radiator capable of having a plurality of electrical paths. For example, the first antenna element 210 may transmit or receive a signal of a first frequency band (e.g., a high band) and a signal of a second frequency band (e.g., a mid band) through the plurality of electrical paths.

The second antenna element 220 according to various embodiments may be the same or similar to the first antenna element 210. The second antenna element 220 may include one or more radiators independent of the radiator of the first antenna element 210. According to an embodiment, the second antenna element 220 may transmit or receive a signal of the first frequency band and a signal of the second frequency band in the same or similar manner to the first antenna element 210.

In the specification, the first antenna element 210 may be referred to as a first antenna, and the second antenna element 220 may be referred to as a second antenna.

According to an embodiment, the first antenna element 210 and the second antenna element 220 may transmit or receive RF signals of different bands to support CA. For example, to support CA between Band 1 of Table 1 and Band 3 of Table 1, the first antenna element 210 may transmit or receive a signal corresponding to Band 1, and the second antenna element 220 may transmit or receive a signal corresponding to Band 3.

According to an embodiment, the signal transmitted or received by the first antenna element 210 and the second antenna element 220 is not limited to the first frequency band and the second frequency band. For example, the first antenna element 210 may transmit or receive a signal of a third frequency band (e.g., a low band) as well as the first frequency band and the second frequency band.

The first RF block 230 according to various embodiments may be electrically connected with the first antenna element 210, the second antenna element 220, and the transceiver 250. According to an embodiment, the first RF block 230 may include a first transmit and receive circuitry 231 and a second transmit and receive circuitry 232. In an embodiment, the first RF block 230 may further include a first switch (e.g., a first switch 331 of FIG. 3). In this case, the first RF block 230 may be connected with the first antenna element 210 and the second antenna element 220 by the first switch. In the specification, the first RF block 230 may be referred to as a first wireless module.

The first transmit and receive circuitry 231 and the second transmit and receive circuitry 232 according to various embodiments may process the signal of the first frequency band or the signal of the second frequency band. For example, the first transmit and receive circuitry 231 may process an RF signal received from the transceiver 250 and may transmit the signal, the processing of which is completed, to an external device (e.g., a base station or another electronic device) via the first antenna element 210 or the second antenna element 220.

According to an embodiment, each of the first transmit and receive circuitry 231 and the second transmit and receive circuitry 232 may include at least one power amplifier (PA) and at least one low noise amplifier (LNA). The PA may amplify a signal transmitted from the transceiver 250 to a signal having a sufficient power before transmitting the signal. The LNA may amplify signals received from the antenna elements 210 and 220.

The RF receive circuitry 240 according to various embodiments may be electrically connected with the first antennal element 210 and the second antenna element 220 and may receive a signal of the first frequency band or a signal of the second frequency band. According to an embodiment, the RF receive circuitry 240 may be integrated into the first RF block 230. In an embodiment, the RF receive circuitry 240 may be connected with the first antenna element 210 and the second antenna element 220 by the first switch (e.g., the first switch 331 of FIG. 3) capable of being included in the first RF block 230.

According to an embodiment, the RF receive circuitry 240 may include at least one LNA. In an embodiment, the RF receive circuitry 240 may receive an RF signal from the first antenna element 210 or the second antenna element 220 and may amplify the received signal. The amplified signal may be delivered to the transceiver 250.

According to an embodiment, the RF receive circuitry 240 may be a circuitry for diversity. The RF signals received via the antenna elements 210 and 220 may be distorted by constructive interference or destructive interference. In an embodiment, the electronic device 201 may perform diversity using a signal received via the RF receive circuitry 240 to reduce distortion of the signal. According to an embodiment, the diversity may include, for example, polarization diversity, spatial diversity, radiation pattern diversity, or the like. According to an embodiment, the signal received from the RF receive circuitry 240 may correspond to the same signal as a signal received from the first RF block 230.

The transceiver 250 according to various embodiments may mutually convert a baseband signal and an RF signal. According to an embodiment, the transceiver 250 may convert a baseband signal received from the processor 280 into an RF signal and may deliver the converted RF signal to the first RF block 230. On the other hand, the transceiver 250 may convert an RF signal received from the first RF block 230 into a baseband signal and may deliver the converted baseband signal to the processor 280.

According to an embodiment, the transceiver 250 may process a signal to be transmitted by the electronic device 201 or a signal received by the electronic device 201. For example, the transceiver 250 may convert a baseband signal received from the processor 280 into a signal corresponding to Band 1 or a signal corresponding to Band 3 for uplink CA between Band 1 and Band 3 of Table 1 and may transmit the converted signal to the first RF block 230.

According to another embodiment, the transceiver 250 may mix a signal received from the first RF block 230 with a signal received from the RF receive circuitry 240 to perform diversity.

According to an embodiment, the electronic device 201 may further include at least one power source. The at least one power source may supply power to the PA included in the first transmit and receive circuitry 231 or the second transmit and receive circuitry 232. According to an embodiment, the first power source 260 may supply power to the PA of the first transmit and receive circuitry 231, and the second power source 270 may supply power to the second transmit and receive circuitry 232. According to an embodiment, the first power source 260 and the second power source 270 may be controlled by the processor 280.

According to an embodiment, the power source may include a supply modulator. The supply modulator may adjust the voltage (or current) of supply power depending on intensity of a signal input to the PA included in the first transmit and receive circuitry 231. For example, the supply modulator may adjust a voltage waveform of supply power to follow an envelope of a PA input signal (so-called envelope tracking). Power efficiency may be enhanced by the supply power adjustment of the supply modulator.

The processor 280 (e.g., a processor 120 of FIG. 1) according to various embodiments may be electrically connected with, for example, the components included in the electronic device 201 and may execute calculation and/or data processing about control and/or communication of the components included in the electronic device 201. The processor 280 may be implemented with, for example, dedicated hardware (e.g., chip) or may be included and implemented as a part of at least one of an application processor (AP) or a communication processor (CP).

According to an embodiment, the processor 280 may control operations of the components included in the electronic device 201, for example, the first RF block 230 or the RF receive circuitry 240, directly or via the transceiver 250. In an embodiment, the processor 280 may control the components through its control signal. In various embodiments, an interface of the control signal may include a general purpose input/output (GPIO), a mobile industry processor interface (MIPI), a serial programming interface (SPI), or the like.

Figure 3:
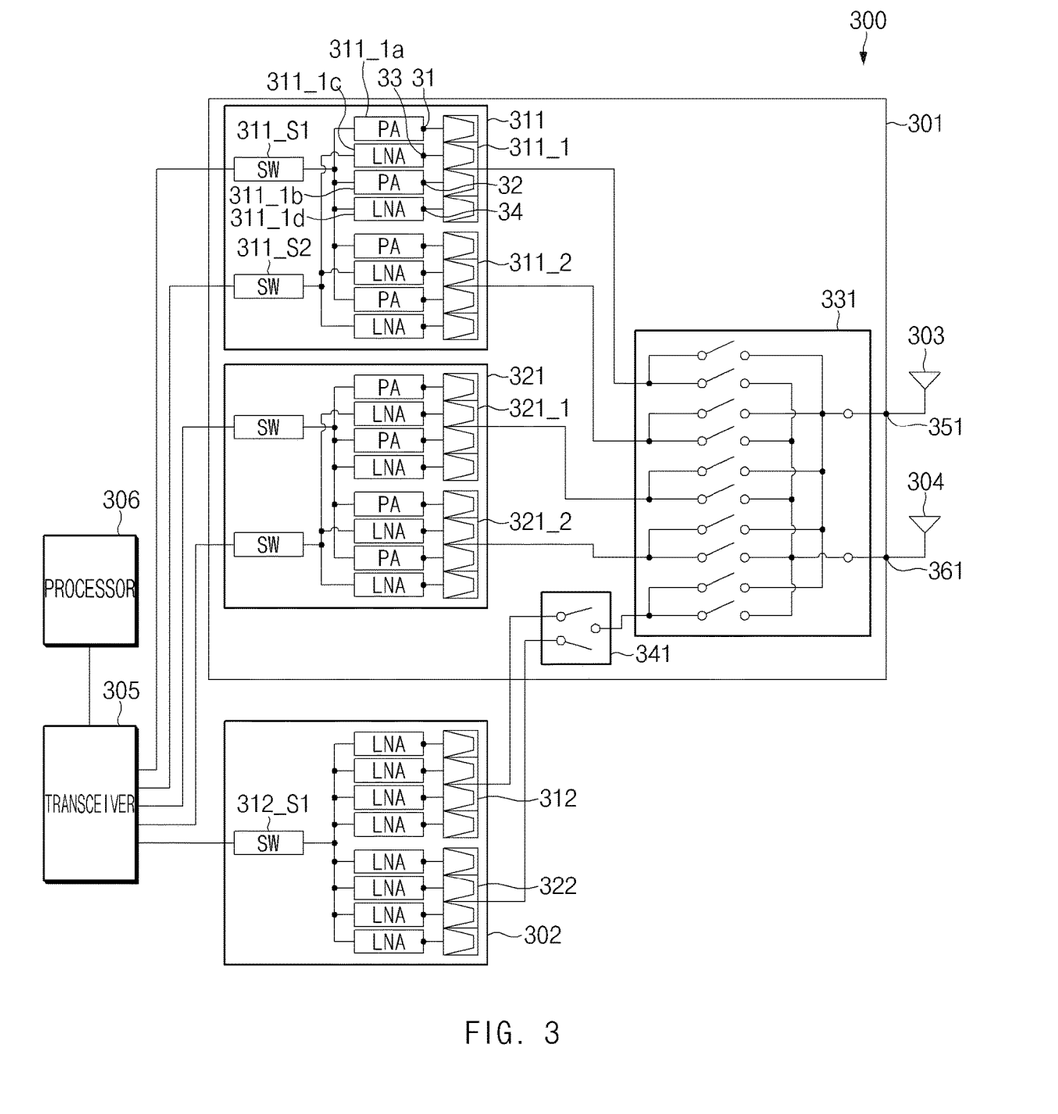
FIG. 3 illustrates an electronic device for supporting various CA combinations, according to an embodiment.

FIG. 3 illustrates an electronic device for supporting various CA combinations, according to an embodiment.

Referring to FIG. 3, an electronic device 300 may include a first RF block 301, an RF receive circuitry 302, a first antenna element 303, a second antenna element 304, a transceiver 305, and a processor 306. The electronic device 300 may correspond to, for example, an electronic device 201 shown in FIG. 2.

The first RF block 301 according to various embodiments may include a first transmit and receive circuitry 311, a second transmit and receive circuitry (321), a first switch 331, and a second switch 341. In various embodiments, the first RF block 301 may exclude at least one of the components or may additionally include another component. For example, the first switch 331 or the second switch 341 may be omitted or may be located outside the first RF block 301. According to various embodiments, as the RF receive circuitry 302 is located in the first RF block 301, it may become an additional component of the first RF block 301. For another example, a first transmission and reception connection terminal 351 and a second transmission and reception connection terminal 361 may be included in the first RF block 301. In various embodiments, the first transmission and reception connection terminal 351 may be connected with the first antenna element 303, and the second transmission and reception connection terminal 361 may be connected with the second antenna element 304.

The first transmit and receive circuitry 311 according to various embodiments may include a first multiplexer 311_1 and a second multiplexer 311_2. In various embodiments, the first transmit and receive circuitry 311 may additionally include another component other than the components. For example, the first transmit and receive circuitry 311 may further include at least one PA or at least one LNA.

Each of the first multiplexer 311_1 and the second multiplexer 311_2 according to various embodiments may select any one of two PA output terminals and two LNA input terminals and may connect the selected terminal with the first switch 331. For example, the first multiplexer 311_1 may select any one of an output terminal 31 of a first PA 311_1a for transmitting a first signal of a first frequency band, an output terminal 32 of a second PA 311_1b for transmitting a second signal of the first frequency band, an input terminal 33 of a first LNA 311_1c for receiving the first signal of the first frequency band, and an input terminal 34 of a second LNA 311_1d for receiving the second signal of the first frequency band and may connect the selected terminal with the first switch 331.

According to an embodiment, the PAs (e.g., 311_1a and 311_1b) included in the first transmit and receive circuitry 311 and the second transmit and receive circuitry 321 may be connected with the transceiver 305 via a switch 311_S1. The PA selected by the switch 311_S1 may be connected with the transceiver 305, and a signal received from the transceiver 305 may be transmitted to an external device (e.g., a base station or another electronic device) via the PA.

According to an embodiment, the LNAs (e.g., 311_1c and 311_1d) included in the first transmit and receive circuitry 311 and the second transmit and receive circuitry 321 may be connected with the transceiver 305 via a switch 311_S2. The LNA selected by the switch 311_S2 may be connected with the transceiver 305, and a signal received from the external device may be transmitted to the transceiver 305 via the selected LNA.

In an embodiment, the number of PAs or LNAs connected with the first multiplexer 311_1 or the second multiplexer 311_2 may be combined in various manners. For example, the first multiplexer 311_1 may be connected with three PA output terminals and one LAN input terminal.

In an embodiment, control of the first multiplexer 311_1 and the second multiplexer 311_2 may be performed by the processor 306. For example, when wanting to transmit an RF signal, the processor 306 may control the multiplexers 311_1 and 311_2 to connect an output terminal (e.g., 31 or 32) of the PA with the first switch 331. When wanting to receive an RF signal, the processor 306 may control the multiplexers 311_1 and 311_2 to connect an input terminal (e.g., 33 or 34) of the LNA with the first switch 331. In an embodiment, the processor 306 may control the multiplexers 311_1 and 311_2 to transmit or receive a signal of a specific band. For example, the processor 306 may control the first multiplexer 311_1 such that the output terminal 31 of the first PA 311_1a is connected to the first switch 331 to transmit a signal transmitted from the first PA 311_1a.

In an embodiment, the first multiplexer 311_1 and the second multiplexer 311_2 may be designed to process signals of different frequency bands. For example, the first multiplexer 311_1 may engage in transmitting or receiving a signal of the first frequency band, and the second multiplexer 311_2 may engage in transmitting or receiving a signal of the second frequency band.

The second transmit and receive circuitry 321 according to various embodiments may have the same or similar configuration to the first transmit and receive circuitry 311. The second transmit and receive circuitry 321 may include a third multiplexer 321_1 and a fourth multiplexer 321_2. The third multiplexer 321_1 and the fourth multiplexer 321_2 may correspond to the first multiplexer 311_1 and the second multiplexer 311_2, respectively.

The first switch 331 according to various embodiments may connect the first transmit and receive circuitry 311, the second transmit and receive circuitry 321, or the RF receive circuitry 302 with the first antenna element 303 or the second antenna element 304. The first switch 331 according to another embodiment may connect the first transmit and receive circuitry 311, the second transmit and receive circuitry 321, or the RF receive circuitry 302 with the first transmission and reception connection terminal 351 or the second transmission and reception connection terminal 361. The first transmission and reception connection terminal 351 may be connected with the first antenna element 303, and the second transmission and reception connection terminal 361 may be connected with the second antenna element 304.

According to an embodiment, the first switch 331 may include a plurality of single pole single throw (SPST) switches. In an embodiment, the first multiplexer 311_1 and the second multiplexer 311_2 of the first transmit and receive circuitry 311, the third multiplexer 321_1 and the fourth multiplexer 321_2 of the second transmit and receive circuitry 321, and the RF receive circuitry 302 may be connected with a pole of the first switch 331. The pole may refer to an arm capable of moving the switch, and a throw may refer to the number of paths with which one pole may come into contact. For example, the SPST switch may have one movable arm, and the arm may come into contact with or come off one path. According to an embodiment, each of the multiplexers 311_1, 311_2, 321_1, and 321_2 and the RF receive circuitry 302 may be connected with the first antenna element 303 or the second antenna element 304 by two SPST switches which are movable independently.

According to an embodiment, the first switch 331 may be controlled by the processor 306. In an embodiment, the processor 306 may control the first switch 331 such that any one of the first multiplexer 311_1 and the second multiplexer 311_2 is connected with the first antenna element 303 and such that any one of the third multiplexer 321_1 and the fourth multiplexer 321_2 is connected with the second antenna element 304 to perform CA. For example, the processor 306 may control the first switch 331 such that the first multiplexer 311_1 is connected with the first antenna element 303 and such that the third multiplexer 321_1 is connected with the second antenna element 304. In this case, the processor 306 may perform uplink CA or downlink CA using one of two bands selectable by the first multiplexer 311_1 and one of two bands selectable by the third multiplexer 321_1.

According to an embodiment, the processor 306 may control the first switch 331 such that any one of the first multiplexer 311_1, the second multiplexer 311_2, the third multiplexer 321_1, or the fourth multiplexer 321_2 is connected with the first antenna element 303 and such that the RF receive circuitry 302 is connected with the second antenna element 304 to perform diversity. For example, the processor 306 may control the first switch 331 such that the first multiplexer 311_1 is connected with the first antenna element 303 and such that the RF receive circuitry 302 is connected with the second antenna element 304. In this case, the same signal which belongs to the same band may be received via the first RF block 301 and the RF receive circuitry 302, and the processor 306 may perform diversity using the received signal.

According to an embodiment, when performing the CA or diversity and when a specific multiplexer for a selected band and an antenna are connected with each other, the processor 306 may allow the other multiplexers not to be connected with the antenna elements 303 and 304. When the processor 306 will perform CA between signals of the first frequency band, because there is a need to block a signal of the second frequency band, the processor 306 may allow the second multiplexer 311_2 and the fourth multiplexer 321_2 not to be connected with the antenna elements 303 and 304.

Through the process, an electronic device (e.g., an electronic device 201 of FIG. 2) may perform CA using various combinations between four bands of the first frequency band and four bands of the second frequency band and may perform diversity for each band.

The second switch 341 according to various embodiments may connect between the RF receive circuitry 302 and the first switch 331. In an embodiment, the second switch 341 may be omitted. In other words, the RF receive circuitry 302 and the first switch 331 may be directly connected with each other. The RF receive circuitry 302 may include a fifth multiplexer 312 and a sixth multiplexer 322, and the second switch 341 may select any one of the fifth multiplexer 312 and the sixth multiplexer 322 and may connect the selected multiplexer with the first switch 331. In an embodiment, the second switch 341 may be controlled by the processor 306 based on the signal received by the RF receive circuitry 302.

According to an embodiment, LNAs included in the RF receive circuitry 302 may be connected with the transceiver 305 via a switch 312_S1. The LNA selected by the switch 312_S1 may be connected with the transceiver 305, and a signal received from the external device may be transmitted to the transceiver 305 via the selected LNA.

Figure 4:
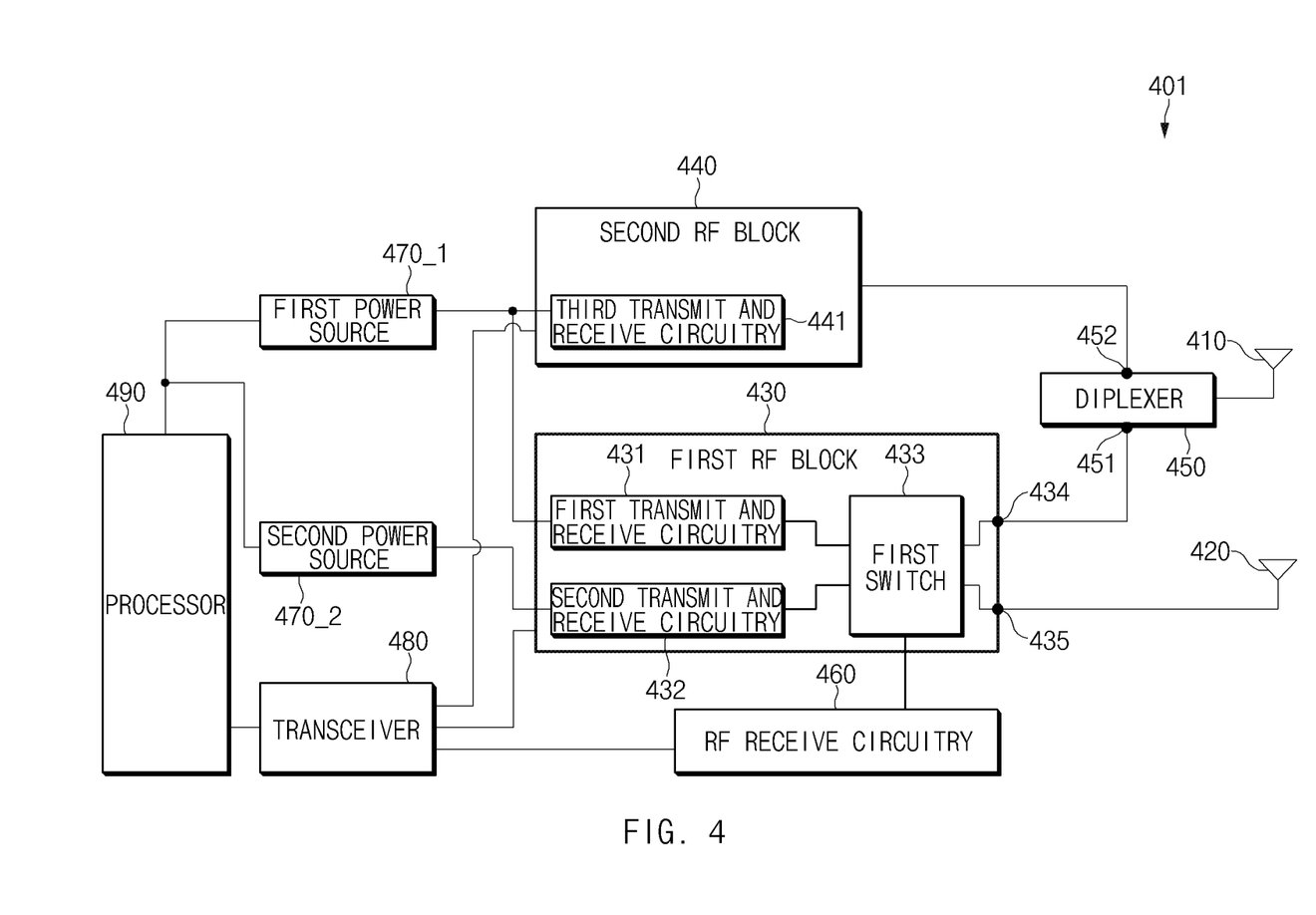
FIG. 4 illustrates a block diagram of an electronic device according to another embodiment.

FIG. 4 illustrates a block diagram of an electronic device according to another embodiment.

Referring to FIG. 4, an electronic device 401 (e.g., an electronic device 101 of FIG. 1) may include a first antenna element 410, a second antenna element 420, a first RF block 430, a second RF block 440, a diplexer 450, an RF receive circuitry 460, a first power source 470_1, a second power source 470_2, a transceiver 480, and a processor 490. In various embodiments, the electronic device 401 may exclude at least one of the components or may additionally include another component. In a description of FIG. 4, a duplicated description of the configuration described in FIG. 2 or 3 may be omitted.

The first antenna element 410 (e.g., an antenna module 197 of FIG. 1) according to various embodiments may have a plurality of electrical paths and may be configured to transmit or receive a signal of a first frequency band (e.g., a high band), a signal of a second frequency band (e.g., a mid band), and a signal of a third frequency band (e.g., a low band).

The first RF block 430 (e.g., a first RF block 301 of FIG. 3) according to various embodiments may include a first transmit and receive circuitry 431, a second transmit and receive circuitry 432, a first switch 433 (e.g., a first switch 331 of FIG. 3), a first transmission and reception connection terminal 434 (e.g., a first transmission and reception connection terminal 351 of FIG. 3), and a second transmission and reception connection terminal 435 (e.g., a second transmission and reception connection terminal 361 of FIG. 3). In an embodiment, some of the components of the first RF block 430 may be omitted or added. For example, the first RF block 430 may further include a second switch (e.g., a second switch 341 of FIG. 3).

The second RF block 440 according to various embodiments may include a third transmit and receive circuitry 441 and may be electrically connected with the first antenna element 410 and the transceiver 480. In the specification, the second RF block 440 may be referred to as a second wireless module. According to an embodiment, the second RF block 440 may process a signal of the third frequency band via the third transmit and receive circuitry 441. For example, the second RF block 440 may process an RF signal received from the transceiver 480 and may transmit the signal, the pressing of which is completed, to an external device (e.g., a base station or another electronic device) via the first antenna element 410. According to an embodiment, the third transmit and receive circuitry 441 may include at least one PA and at least one LNA.

The diplexer 450 according to various embodiments may correspond to a filter element for branch for splitting one signal into two signals and may connect each of the first RF block 430 and the second RF block 440 to the first antenna element 410. In the specification, the diplexer 450 may be referred to as a filter. According to an embodiment, the diplexer 450 may play a role in splitting a signal of the first frequency band and a signal of the second frequency band and a signal of the third frequency band. The split signal of the first frequency band and the split signal of the second frequency band may be delivered to the first RF block 430, and the split signal of the third frequency band may be delivered to the second RF block 440.

According to an embodiment, the diplexer 450 may include a first connecting terminal 451 and a second connecting terminal 452. The first connecting terminal 451 may be a terminal corresponding to the first frequency band and the second frequency band, which is a terminal for connecting the diplexer 450 and the first RF block 430. The second connecting terminal 452 may be a terminal corresponding to the third frequency band, which is a terminal for connecting the diplexer 450 and the second RF block 440.

The first power source 470_1 and the second power 470_2 according to various embodiments may correspond to devices which supply power to a PA included in the first RF block 430 or the second RF block 440. According to an embodiment, the first power source 470_1 and the second power source 470_2 may supply power to a plurality of PAs. For example, the first power source 470_1 may supply power to a PA included in the first transmit and receive circuitry 431 of the first RF block 430 and a PA included in the third transmit and receive circuitry 441 of the second RF block 440. For another example, the second power source 470_2 may supply power to a PA included in the first transmit and receive circuitry 431 or a PA included in the second transmit and receive circuitry 432. According to various embodiments, the first power source 470_1 and the second power source 470_2 may be connected with the first transmit and receive circuitry 431, the second transmit and receive circuitry 432, and/or the third transmit and receive circuitry 441 by various combinations and may supply power to a PA included in each of transmit and receive circuitries 431, 432, and 441.

The transceiver 480 according to various embodiments may be connected with the first RF block 430, the second RF block 440, and the RF receive circuitry 460 and may mutually convert signals of the first frequency band, the second frequency band, and the third frequency band into baseband signals.

The processor 490 according to various embodiments may control operations of the first RF block 430, the second RF block 440, the RF receive circuitry 460, the first power source 470_1, the second power source 470_2, and the diplexer 450, directly or via the transceiver 480.

Figure 5:
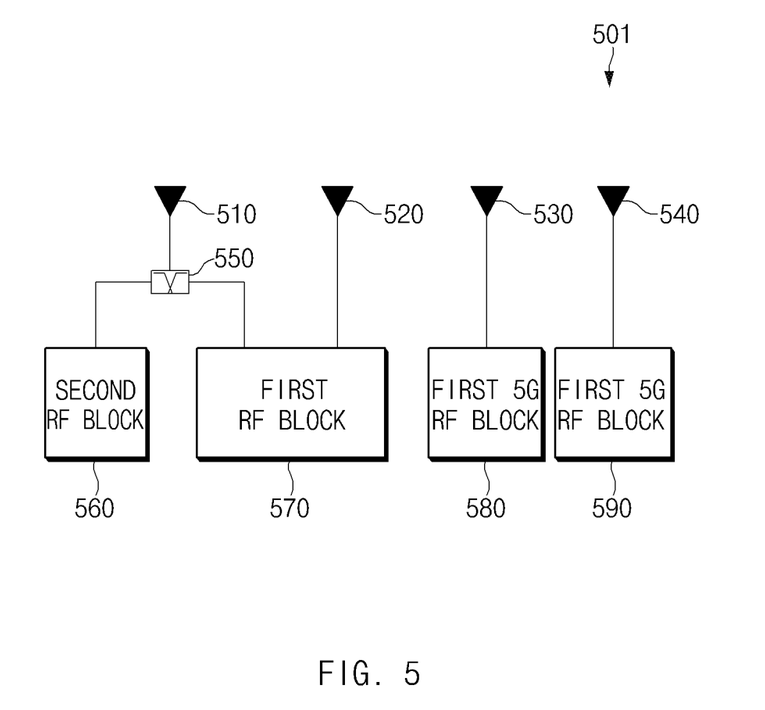
FIG. 5 illustrates an antenna structure capable of additionally supporting a 5G communication service, according to an embodiment.

FIG. 5 illustrates an antenna structure capable of additionally supporting a 5G communication service, according to an embodiment.

Referring to FIG. 5, an electronic device (e.g., an electronic device 201 of FIG. 2) according to the disclosure may transmit or receive signals of a first frequency band, a second frequency band, and a third frequency band using a first antenna element 510 and a second antenna element 520. As a diplexer 550 is connected with the first antenna element 510, the signal of the third frequency band may be split and processed. The signal of the third frequency band may be processed by a second RF block 560. The signal of the first frequency band and the signal of the second frequency band may be transmitted or received via the first antenna element 510 and the second antenna element 520. The signal of the first frequency band and the signal of the second frequency band may be processed by a first RF block 570.

According to an embodiment, the number of antenna elements which may be provided may be limited due to limited mounting space in the electronic device. The electronic device according to the disclosure may implement transmission or reception of signals of the first frequency band, the second frequency band, and the third frequency band and performance of 2×2 multi input multi output (MIMO), CA, and diversity in the bands, using only the two antenna elements 510 and 520. As described above, the electronic device according to an embodiment may reduce the number of the antenna elements and may use spare antenna elements 530 and 540 as antenna elements for a 5G communication service.

According to an embodiment, the electronic device according to the disclosure may use the two antenna elements 530 and 540 for the 5G communication service to support 2×2 MIMO, CA, and diversity in 5G communication at the same time as an existing communication service. Processing of a signal for the 5G communication service may be performed by a first 5G RF block 580 and a second 5G RF block 590.

Figure 6:
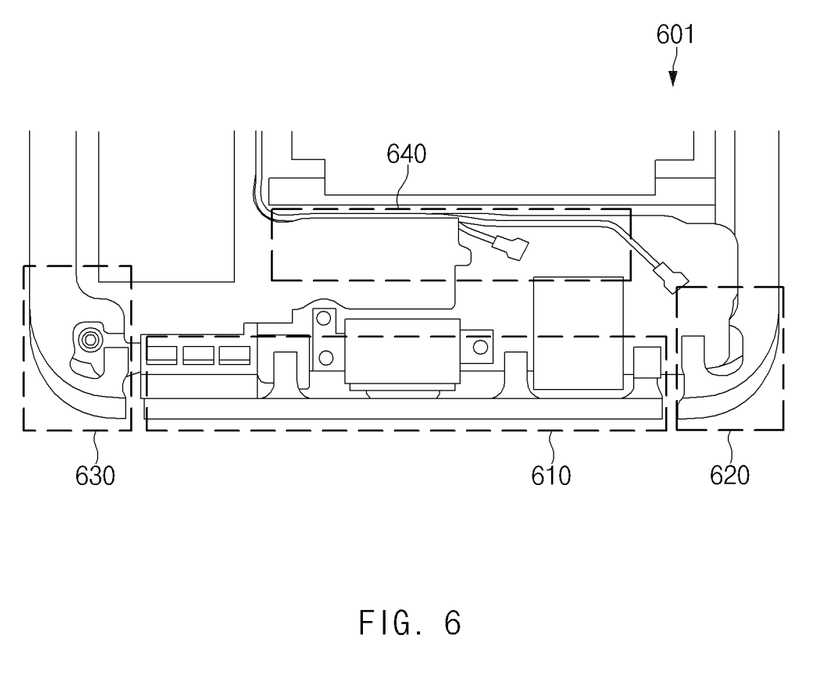
FIG. 6 illustrates the deployment of antenna elements according to an embodiment.

FIG. 6 illustrates the deployment of antenna elements according to an embodiment.

Referring to FIG. 6, four antenna elements 610, 620, 630, and 640 may be arranged in a lower end of an electronic device 601 according to various embodiments. The first antenna 610 forming the longest electrical path may transmit and receive a signal of a third frequency band (e.g., a low band). The first antenna 610 may correspond to, for example, a first antenna element 510 of FIG. 5.

According to an embodiment, the other three antennas 620, 630, and 640 may be used as a second antenna element 520 of FIG. 5 and two antenna elements 530 and 540 for a 5G communication service.

According to various embodiments, the deployment of antennas in an electronic device is not limited to the deployment of the antennas shown in FIG. 6, and may be disposed in various forms.

The electronic device according to various embodiments may integrate RF blocks, which process signals of a mid band and a high band, to minimize a space where components are mounted and efficiently use antennas. The electronic device may use some of antennas capable of being mounted on the electronic device as antennas for 5G by efficiently using the antennas. As a result, because the electronic device is able to perform wireless communication using a signal of a frequency band of 6 GHz or lower and a signal of a very high frequency band of 28 GHz or higher, communication performance of the electronic device may be enhanced.

Furthermore, the electronic device according to various embodiments may use an RF block including a plurality of multiplexers to implement CA using combinations of various frequency bands. Thus, according to the disclosure, one electronic device may support all of combinations of various frequency bands for CA provided by a plurality of countries and/or operators.

An electronic device according to an embodiment may include a first antenna element configured to transmit and receive a signal of a first frequency band or a second frequency band, a second antenna element configured to transmit and receive a signal of the first frequency band or the second frequency band, a first RF block, electrically connected with the first antenna element and the second antenna element, including a first transmit and receive circuitry and a second transmit and receive circuitry, an RF receive circuitry for receiving the signal of the first frequency band or the second frequency band from the first antenna element or the second antenna element, and a transceiver connected with the first RF block and the RF receive circuitry. The first transmit and receive circuitry may process the signal of the first frequency band or the second frequency band. The second transmit and receive circuitry may process the signal of the first frequency band or the second frequency band. The transceiver may perform CA for the signal of the first frequency band and/or the second frequency band using the first transmit and receive circuitry and the second transmit and receive circuitry and may perform diversity for signals received from the first RF block and the RF receive circuitry.

According to an embodiment, the RF receive circuitry may be configured in the first RF block.

The electronic device according to an embodiment may further include a first power source and a second power source. The first transmit and receive circuitry may include at least one PA, and the second transmit and receive circuitry may include at least one PA. The first power source may supply power to the PA included in the first transmit and receive circuitry, and the second power source may supply power to the PA included in the second transmit and receive circuitry.

According to an embodiment, the first power source and the second power source may correspond to supply modulators.

The electronic device according to an embodiment may further include a second RF block including a third transmit and receive circuitry and a diplexer. The first antenna element may be configured to further receive a signal of a third frequency band. The third transmit and receive circuitry may process the signal of the third frequency band. The diplexer may connect the first RF block and the second RF block to the first antenna element and may split the signal of the first frequency band and the signal of the second frequency band and the signal of the third frequency band.

The electronic device according to an embodiment may further include a first power source and a second power source. The first transmit and receive circuitry may include at least one PA, the second transmit and receive circuitry may include at least one PA, and the third transmit and receive circuitry may include at least one PA. The first power source may supply power to the PA included in the first transmit and receive circuitry and the PA included in the third transmit and receive circuitry, and the second power source may supply power to the PA included in the second transmit and receive circuitry.

In an embodiment, the first RF block may further include a first switch. The first switch may connect a first multiplexer of the first transmit and receive circuitry, a second multiplexer of the first transmit and receive circuitry, a third multiplexer of the second transmit and receive circuitry, a fourth multiplexer of the second transmit and receive circuitry, and the RF receive circuitry with the first antenna element and the second antenna element.

The electronic device according to an embodiment may further include a processor. The processor may be electrically connected with the transceiver and may control the first switch.

According to an embodiment, when wanting to performing CA, the processor may control the first switch such that any one of the first multiplexer and the second multiplexer is connected with the first antenna element and such that any one of the third multiplexer and the fourth multiplexer is connected with the second antenna element.

According to an embodiment, when wanting to perform diversity, the processor may control the first switch such that any one of the first multiplexer, the second multiplexer, the third multiplexer, or the fourth multiplexer is connected with the first antenna element and such that the RF receive circuitry is connected with the second antenna element.

The electronic device according to an embodiment may further include a second switch. The second switch may electrically connect the first switch and the RF receive circuitry.

A throw of the second switch may be connected with a pole of the first switch.

A pole of the second switch may be connected to a fifth multiplexer of the RF receive circuitry and a sixth multiplexer of the RF receive circuitry.

The processor may control the second switch based on a frequency band of a signal received by the RF receive circuitry.

An electronic device according to an embodiment may include a first antenna, a second antenna, a filter, electrically connected with the first antenna, including a first connecting terminal corresponding to a first frequency band and a second frequency band capable of being transmitted or received via the first antenna, and a second connecting terminal corresponding to a third frequency band capable of being transmitted or received via the first antenna, a first wireless module including a first transmit and receive circuitry for processing a signal of the first frequency band and a signal of the second frequency band, a second transmit and receive circuitry for processing a signal of the first frequency band and a signal of the second frequency band, a first transmission and reception connection terminal connected with the first connecting terminal, and a second transmission and reception connection terminal connected with the second antenna, and a first switch for connecting the first transmit and receive circuitry and the second transmit and receive circuitry with the first transmission and reception connection terminal or the second transmission and reception connection terminal, and a second wireless module including a third transmit and receive circuitry, electrically connected with the second connecting terminal, for processing a signal of the third frequency band.

According to an embodiment, the electronic device may further include a transceiver. The transceiver may be electrically connected with the first wireless module and the second wireless module and may perform CA for the signal of the second frequency band and/or the signal of the third frequency band.

According to an embodiment, the electronic device may further include an RF receive circuitry. The RF receive circuitry may be electrically connected with the first switch and the transceiver, may receive the signal of the second frequency band or the third frequency band, and may perform diversity for signals received from the second wireless module and the RF receive circuitry.

In an embodiment, the RF receive circuitry may be integrally configured with the first wireless module.

According to an embodiment, the electronic device may further include a first power source and a second power source. The first power source may supply power to PAs included in the first transmit and receive circuitry and the second transmit and receive circuitry, and the second power source may supply power to a PA included in the third transmit and receive circuitry. In an embodiment, the first power source and the second power source may correspond to supply modulators.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

What is claimed is:

1. A portable communication device comprising:
   a plurality of antennas including a first antenna and a second antenna, the first antenna configured to transmit and receive a first signal corresponding to a first frequency band or a second frequency band, the second antenna configured to transmit and receive a second signal corresponding to the first frequency band, the second frequency band or a third frequency band;
   a radio frequency (RF) receive circuitry configured to receive the first signal from the first antenna and the second signal from the second antenna;
   a first RF module electrically connected with the first antenna and the second antenna, and configured to support the first frequency band and the second frequency band;
   a second RF module electrically connected with the second antenna, and configured to support the third frequency band; and
   a diplexer electrically connected with the second antenna, the first RF module, and the second RF module,
   wherein the second antenna is electrically connected with the first RF module and the second RF module via the diplexer.

2. The portable communication device of claim 1, wherein the diplexer is configured to:
   provide at least one portion of a first RF signal received from the second antenna to the first RF module, the first RF signal corresponding to the first frequency band or the second frequency band; and
   provide at least one portion of a second RF signal received from the second antenna to the second RF module, the second RF signal corresponding to the third frequency band.

3. The portable communication device of claim 1,
   wherein the first RF module comprises a first transmit and receive circuitry, a second transmit and receive circuitry, and a switch,
   wherein the switch is configured to provide a first connection and a second connection simultaneously,
   wherein the first connection is between the first antenna and one of the first transmit and receive circuitry, the second transmit and receive circuitry, and the RF receive circuitry, and
   wherein the second connection is between the second antenna and another one of the first transmit and receive circuitry, the second transmit and receive circuitry and the RF receive circuitry.

4. The portable communication device of claim 1, wherein the second RF module comprises a third transmit and receive circuitry.

5. The portable communication device of claim 1,
   wherein the first transmit and receive circuitry comprises a first multiplexer and a second multiplexer,
   wherein the first multiplexer is configured to process a signal corresponding to a first frequency range, and
   wherein the second multiplexer configured to process a signal corresponding to a second frequency range different from the first frequency range.

6. The portable communication device of claim 5, wherein the first frequency range is a subband of the first frequency band, and the second frequency range is a subband of the second frequency band.

7. The portable communication device of claim 1,
   wherein the second transmit and receive circuitry comprises a third multiplexer and a fourth multiplexer,
   wherein the third multiplexer is configured to process a signal corresponding to a third frequency range, and
   wherein the fourth multiplexer is configured to process a signal corresponding to a fourth frequency range different from the third frequency range.

8. The portable communication device of claim 7,
   wherein the first RF module comprises a first transmit and receive circuitry, a second transmit and receive circuitry, and a switch, and
   wherein the first transmit and receive circuitry comprises a first multiplexer and a second multiplexer.

9. The portable communication device of claim 8,
   wherein the first multiplexer and the second multiplexer are connected with the first antenna or the second antenna via the switch, and
   wherein the third multiplexer and the fourth multiplexer are connected with the first antenna or the second antenna via the switch.

10. The portable communication device of claim 1, wherein the first antenna is configured to not support the third frequency band.

11. The portable communication device of claim 1, wherein each of the first RF module and the second RF module is connected with a first power source.

12. The portable communication device of claim 1, wherein the second RF module is further connected with a second power source, and the first RF module is not connected with the second power source.

* * * * *